UNITED STATES PATENT OFFICE.

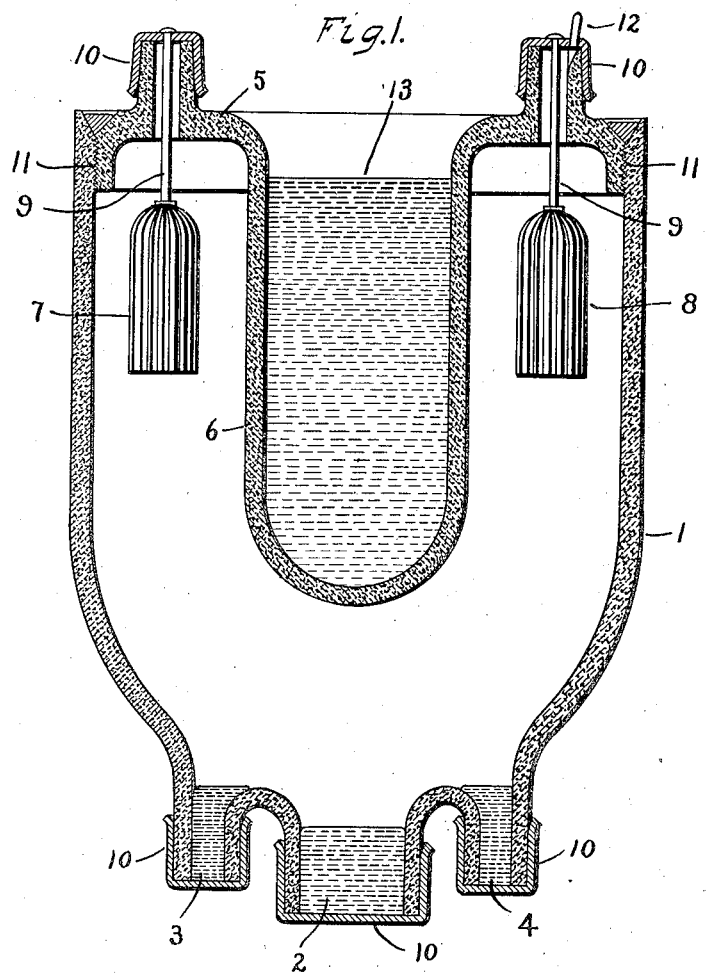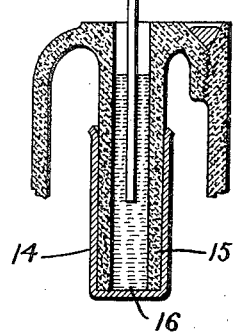

JOSEPH L. R. HAYDEN, OF SCHENECTADY, NEW YORK, ASSIGNOR TO GENERAL ELECTRIC COMPANY, A CORPORATION OF NEW YORK.

LAVA VAPOR-TUBE.

1,047,520.     Specification of Letters Patent.     Patented Dec. 17, 1912.

Application filed August 9, 1907. Serial No. 387,817.

*To all whom it may concern:*

Be it known that I, JOSEPH LE ROY HAYDEN, a citizen of the United States, residing at Schenectady, county of Schenectady, State of New York, have invented certain new and useful Improvements in Lava Vapor-Tubes, of which the following is a specification.

Vapor electric devices, such as mercury lamps and rectifiers, ordinarily comprise an evacuated envelop of glass in which the electrodes of the device are mounted. When the quantity of current is considerable, the envelop is commonly provided with an enlargement to operate as a condensing chamber for condensing vapors given off by the cathode during normal operation. The condensing action produced within the tube is due to radiation of heat by the condensing chamber, and therefore if the current is heavy, the condensing chamber must be large. Artificial cooling, such as water circulation cannot ordinarily be used, as the glass will not stand the temperature differences and variations. Very large condensing chambers of glass are subject to breakage from other causes, such as impact of mercury on the glass during transportation, or even from the pressure of the atmosphere.

According to my invention, the tube of the vapor device is built of material which will permit artificial cooling, which will not crack from violent changes in temperature, and which is otherwise suited for use as the envelop of a vapor device. I find that lava or burned steatite (magnesium silicate) can be made into envelops having the qualities above mentioned. This material is inexpensive, can be readily machined, and furthermore, does not conduct electricity and does not amalgamate or otherwise combine with mercury or mercury vapor. In the last mentioned respects, it differs radically from iron, which, when used as the entire envelop of a mercury vapor device, contaminates the mercury and makes it scummy.

Lava rectifiers may be made in two distinct ways, either by cutting the tube or its parts from solid stone, or by pressing or molding the tube from powdered steatite mixed with a binder, such as clay or a high hydrate of magnesium silicate. The former is in my opinion the better process, though when the rectifier is of large size it can advantageously be made of several pieces put together. Rectifiers cut from the solid stone are much heavier and denser than those molded from the powdered material. The molding process above described forms no part of my invention.

Steatite or raw lava, can be drilled and machined with ease, and then, by baking at a high temperature, can be made hard and solid.

Tubes or envelops for vapor devices may be of a great variety of shapes, but one form of tube embodying my invention is shown in the accompanying drawing in which—

Figure 1 is a sectional elevation and Fig. 2 a detail.

The apparatus illustrated consists of a tubular vessel 1 cut from a solid block of steatite and provided at the bottom with a contracted portion serving as a receptacle for the mercury cathode 2 of the rectifier. On either side the cathode 2 is placed a tubular well closed at the bottom in a manner hereinafter described and serving as a receptacle for the mercury of auxiliary anodes 3 and 4. The top of the tubular envelop 1 is closed by means of a screw threaded lava plate 5 having a depending chamber 6 projecting downward a substantial distance within the envelop 1 and serving to convert the space within the envelop into an annular channel communicating along its lower edge with the space immediately adjacent the cathode 2. Within the annular channel formed between the chamber 6 and envelop 1 are mounted the main anodes 7 and 8 of the vapor device. These anodes may be of graphite or other suitable material having a fluted surface and may be carried on leading-in conductors 9 of iron or other suitable material.

The several openings into the vapor device are closed with metal caps 10, each of which consists of thin sheet metal, such as iron, and fits tightly over the end of a tubular projection of the lava. To insure a vacuum tight joint between the metal caps and its lava tube, I first proceed by coating the tube with "blue glaze" of a type commonly used for enameling iron, and I then heat the entire device in a blast furnace to cause the glaze to soak in between the iron and lava. To facilitate this action of the glaze, the iron cap may be slightly flared at its edges. When the joint cools, the glaze solidifies and the iron cap shrinks tightly on the glaze and gives a vacuum tight joint. I find that this joint remains tight even when subjected to rapid changes of temperature.

To insure a vacuum tight joint between the envelop 1 and its closure 5, I may enamel the screw threads 11 before the parts are assembled, and then screw the parts together, while maintaining the enamel in a heated and fluid condition. The enamel then hardens in the threads and gives a tight joint. A V shaped groove above the threads may be filled with enamel or with mercury. In case the rectifier is to be taken apart, the joint can be heated beyond the melting point of the enamel and then unscrewed.

As an alternative method of connecting the end closure 5 with the tubular member 1 of the envelop, I may weld the parts directly together by using an oxygen flame or an arc blast. The surface of the lava melts and flows and so welds over the joint.

I find that lava tubes, even when made from first class steatite and baked at the highest temperatures, are somewhat porous and are liable to slow leaks through the walls themselves. I therefore consider advisable the glazing of the entire rectifier tube. One way of doing this consists in melting the surface of the lava by means of an oxygen flame, or an arc blast, until the surface is uniformly melted over the entire tube. As a preliminary step to this process, I shrink the lava by baking for a considerable time at a temperature as near the melting point as is safe. The glaze or melted lava, above described, is intimately joined with the material of the tube, and so has no tendency to crack or flake.

As an alternative method of preventing slow leaks through the envelop, I may coat it with blue enamel of the well known composition. I find this flows nicely over the lava surface and gives it a vacuum tight glaze. It is even possible to glaze the surface in much the same way that porcelain is glazed, by putting on a coat, such as steatite with a small percentage of potassium silicate, or the feldspar used in porcelain glazing, and then melting and baking, as with porcelain. In applying enamel or other coating to a lava rectifier I may first put the whole rectifier together, then put on the melted enamel, and finally connect the device to the vacuum pump and so suck the enamel in wherever pores or joints may exist.

As a convenient means for connecting the vapor device with a vacuum pump I utilize a small iron tube 12 projecting from one of the iron gaps at the anode end of the device. During exhaustion, the rectifier should be heated to a very high temperature so that all gases may be driven out of the walls of the envelop. A very considerable quantity of gas comes off at first, but by continuing the pumping, the lava is almost completely freed from gas.

Prior to sealing off from the pump, the temperature of the rectifier is lowered, mercury is let in and the mercury arc started. After the arc has been in operation for a time, the tube is disconnected from the pump by sealing off the iron connecting tube 12 by the use of an oxygen flame.

The downwardly projecting chamber 6 may be utilized as a receptacle for a cooling fluid 13 and will serve to keep down the temperature of the rectifier even when it is operated on very high currents. I find that the lava tubes will not break, even though subjected to very rapid and very great temperature changes. The rectifier tube may even attain a red-heat and then be suddenly cooled in water without danger of cracking.

One marked advantage of artificial cooling, such as water circulation, is that the rectifier may be small in volume and still carry a very heavy current. In this respect the lava rectifier is quite different from the ordinary self cooled rectifier with a glass envelop.

Fig. 2 illustrates a modified form of anode comprising an iron cap 14 fitting tightly over the end of a downwardly projecting lava tube 15 and connected with the circuits of the system by means of a body of mercury 16 carried within the lava tube. This body of mercury also serves to insure a vacuum tight joint between the lava tube and the iron cap 14.

What I claim as new and desire to secure by Letters Patent of the United States, is,—

1. An envelop for vapor electric devices consisting essentially of glazed lava.

2. An envelop for vapor electric devices consisting essentially of self glazed lava.

3. An envelop for vapor electric devices, consisting of a plurality of glazed lava parts joined together, and a seal for said joints consisting of vitrified lava.

In witness whereof, I have hereunto set my hand this 8th day of August, 1907.

JOSEPH L. R. HAYDEN.

Witnesses:
BENJAMIN B. HULL,
HELEN ORFORD.